US012791731B2

(12) United States Patent
Holbrook et al.

(10) Patent No.: US 12,791,731 B2
(45) Date of Patent: Nov. 10, 2026

(54) FLIGHT AND LANDING DETECTION AND NOTIFICATION

(71) Applicant: Tile, Inc., San Mateo, CA (US)

(72) Inventors: James Matthew Roberts Holbrook, Boulder, CO (US); James Raymond Thornbrue, Poway, CA (US); Chad Robert Wiedemann, Flemington, NJ (US); Sarim Ahmed, New York, NY (US); Shivali Mathur Shenoy, San Francisco, CA (US)

(73) Assignee: Tile, Inc., San Mateo, CA (US)

( * ) Notice: Subject to any disclaimer, the term of this patent is extended or adjusted under 35 U.S.C. 154(b) by 230 days.

(21) Appl. No.: 18/941,153

(22) Filed: Nov. 8, 2024

(65) Prior Publication Data

US 2026/0133323 A1 May 14, 2026

(51) Int. Cl.

*H04W 4/029* (2018.01)
*G01S 19/15* (2010.01)
*G08G 5/52* (2025.01)
*G08G 5/55* (2025.01)

(52) U.S. Cl.

CPC ................ *G01S 19/15* (2013.01); *G08G 5/52* (2025.01); *G08G 5/55* (2025.01); *H04W 4/029* (2018.02)

(58) Field of Classification Search

CPC ............ G01S 19/15; G08G 5/52; G08G 5/55; H04W 4/029
USPC ...................................................... 455/456.3
See application file for complete search history.

(56) References Cited

U.S. PATENT DOCUMENTS

2011/0047112 A1 2/2011 Ketabdar et al.
2011/0246000 A1* 10/2011 Shavit ...................... G08G 5/22 701/14
2015/0243112 A1* 8/2015 Jensen ...................... B64F 5/60 701/33.4
2020/0204948 A1 6/2020 Keil et al.
2023/0046336 A1* 2/2023 Schirmer ............... G01C 21/20
(Continued)

FOREIGN PATENT DOCUMENTS

WO 2024/014193 A1 1/2024

OTHER PUBLICATIONS

International Search Report & Written Opinion, PCT Application No. PCT/US2025/054700, Mar. 23, 2026, 10 Pages.
(Continued)

*Primary Examiner* — Huy C Ho
(74) *Attorney, Agent, or Firm* — FENWICK & WEST LLP

(57) ABSTRACT

A user's departure from a first airport and landing at a second airport can be detected using tracking device functionality. A user's location (determined using a tracking device) is compared to known airport locations to determine that the user is at a first airport, and an aircraft takeoff event can be identified using tracking device movement information (such as speed and acceleration). In response to the detected aircraft takeoff event, a notification is sent to a set of users associated with the user indicating that the user has taken off from the first airport. A user's second location is compared to known airport locations to determine that the user is subsequently at a second airport. An aircraft landing event can be detected using tracking device movement information, and a second notification is sent to the set of users indicating that the user has landed at the second airport.

20 Claims, 7 Drawing Sheets

(56) References Cited

U.S. PATENT DOCUMENTS

| | | | |
|---|---|---|---|
| 2024/0284396 A1 | 8/2024 | Ghimire et al. | |
| 2024/0403064 A1* | 12/2024 | Guild | G06F 9/4411 |

OTHER PUBLICATIONS

Life360.com, "Flight Detection & Landing Notifications," May 11, 2024, three pages, [Online] [Retrieved on Mar. 24, 2025] Retrieved from the Internet< https://support.life360.com/hc/en-us/articles/23053396597271-Flight-Detection-Landing-Notifications>.

* cited by examiner

FLIGHT AND LANDING DETECTION AND NOTIFICATION

BACKGROUND

This disclosure relates generally to tracking devices, and more specifically, to tracking a user's location with regards to a flight status.

Electronic tracking devices track the location of people and/or objects. For example, a user can use GPS technology to track a device remotely and determine a location of a user of the device. In another example, a user can attach a tracking device to an important object, such as keys or a wallet, and use the features of the tracking device to more quickly locate the object, (e.g., if it becomes lost). In other examples, a tracking device can include a user's mobile device equipped with tracking functionality. This tracking functionality can include sending notifications to associated devices.

SUMMARY

A user's departure from a first airport and landing at a second airport can be detected using tracking device functionality. The user's location is provided from a device (such as a tracking device) to a tracking server, which can compare to provided location to known airport locations to determine that the user is at a first airport. The tracking server can likewise detect an aircraft takeoff event can using tracking device movement information (such as speed and acceleration). In response detecting an aircraft takeoff event, a notification is sent to a set of users associated with the user indicating that the user has taken off from the first airport. A user's second location is later received by the tracking server, which compares it to known airport locations to determine that the user is located at a second airport. An aircraft landing event can be detected by the tracking server using tracking device movement information, and a second notification is sent to the set of users indicating that the user has landed at the second airport.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system. It should be noted that although tracking devices and mobile devices are sometimes described as separate devices herein, a tracking device can include a user's mobile device equipped with tracking functionality (e.g., a mobile device with a tracking application installed).

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
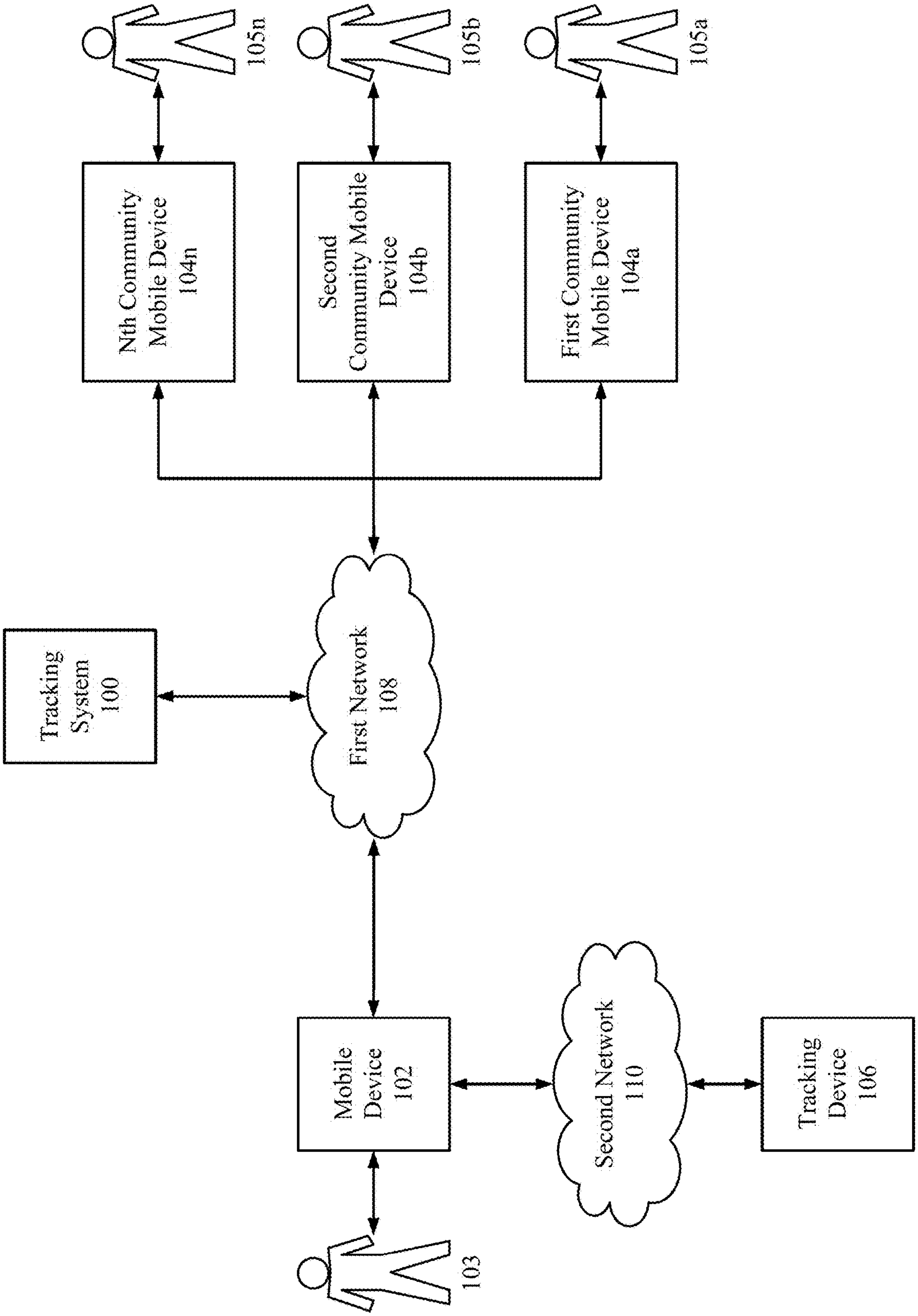
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104*a* through 104*n* (collectively referred to herein as "community mobile devices 104") associated with a plurality of users 105*a* through 105*n* of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106.

Although FIG. 1 illustrates a particular arrangement of the tracking system 100, mobile device 102, community mobile devices 104, and tracking device 106, various additional arrangements are possible. For example, in some embodiments, the tracking system 100 can be implemented within the mobile device 102.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost. In some embodiments, a community of users 105 can include pre-established networks of users (which may include the user 103), for instance users in a friend group that have connected with each other via a mobile device application application running on the mobile devices 102/104. In other embodiments, the users 105 may be unknown to each other and to the user 103.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a communication signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device **104*a* associated with a first community user 105*a*, a second community mobile device 104*b* associated with a second community user 105*b*, and additional communication mobile devices associated with additional community users up to an nth community mobile device 104*n* associated with an nth community user 105*n*. The community mobile devices 104 may also include functionality that enables each community mobile device 104 to identify a tracking device 106 within a proximity or communicable range of the community mobile device 104. In one example, a first community mobile device 104*a* within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104*a* at the time of the communication with the tracking device 106). This information can be used to provide updated locations and/or respond to a location request from the tracking system 100 regarding the tracking device 106. In some embodiments, the steps performed by the first community mobile device 104*a* can be hidden from the first community user 105*a*. Accordingly, the first community mobile device 104*a* can assist in locating the tracking device 106 without bother and without the knowledge of the first community user 105*a***.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
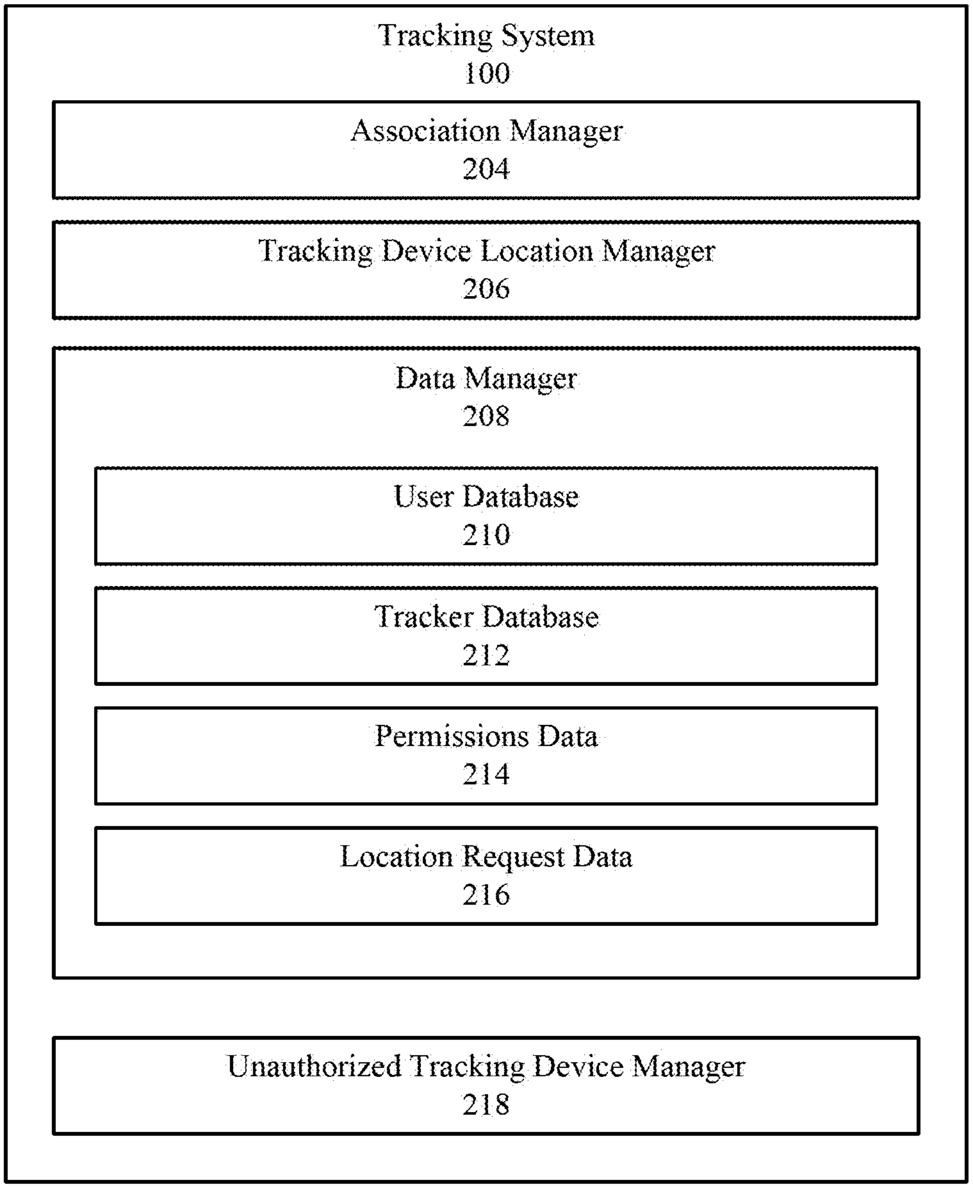
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, a data manager 208, and an unauthorized tracking device manager, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

In some embodiments, the association manager 204 may be used to facilitate identification of authorized and unauthorized devices from one or more wireless devices connected with the mobile device 102. For example, the association manager 204 may be configured to access authorized device identifiers defining a set of authorized devices. The authorized devices may define authorized tracking devices, such as owner tracking devices associated with the user of the mobile device, shared tracking devices associated with a connected user of the user of the mobile device, or other authorized (e.g., non-tracking) wireless devices (e.g., a peripheral device). Each authorized device may be associated with a device identifier. A detected wireless device that fails to include an authorized device identifier may be identified as an unauthorized device. In some embodiments, a list of unauthorized device identifiers may also be stored and referenced to determine whether detected wireless device is an authorized or unauthorized device.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found. In some embodiments, the tracking device location manager 206 may manage providing notifications of tracking device or user status to other users, for instance as described below in greater detail.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106 or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The user database 210 may also include information defining shared tracking devices. A shared tracking device refers to a tracking device that is owned by a different user but is an authorized device for tracking the user. For example, the user database 210 may associate the user with another user (e.g., a friend, connection, etc.) such that a tracking device owned by the other is identified as a shared tracking device for the user.

The user database 210 may store information representative of associations between users, for instance sets of users or user circles or friend groups. The associations can be established by users, for instance by opting in to a set of users via an application running on a mobile device. In some embodiments, the tracking device location manager 206 can, in response to detecting a status of a tracking device or user, identify a set of users associated with the tracking device or user via the user database 210, and can send a notification to the identified set of users.

The data manager 208 may also include a tracker database 212. The tracker database 212 may be used to store data related to tracking devices. For example, the tracker database 212 may include tracking data for any tracking device 106 that has been registered or otherwise authorized with the tracking system 100. Tracking data may include unique tracker identifications (IDs) or "device identifiers" associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106. In some embodiments, the tracker database 212 may further include an authorized tracking device flag indicating whether a specific tracking device 106 has been identified as an unauthorized tracking device for a user.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

The tracking system 100 further includes an unauthorized device manager 218. The unauthorized device manager 218 may be configured to perform the functionalities discussed herein with respect to identifying unauthorized tracking devices from wireless devices detected by a mobile device 102 and performing suitable remedial actions. The unauthorized device manager 218 may be further configured to remotely disable an authorized tracking device if possible, such as when the unauthorized tracking device is a tracking device managed by the tracking system 100 (or a "managed tracking device," as used herein). In another example, if the unauthorized tracking device is not a managed tracking device or otherwise cannot be controlled by the tracking system 100, then a notification may be sent to a (e.g., third party) system associated with the unauthorized tracking device.

Figure 3:
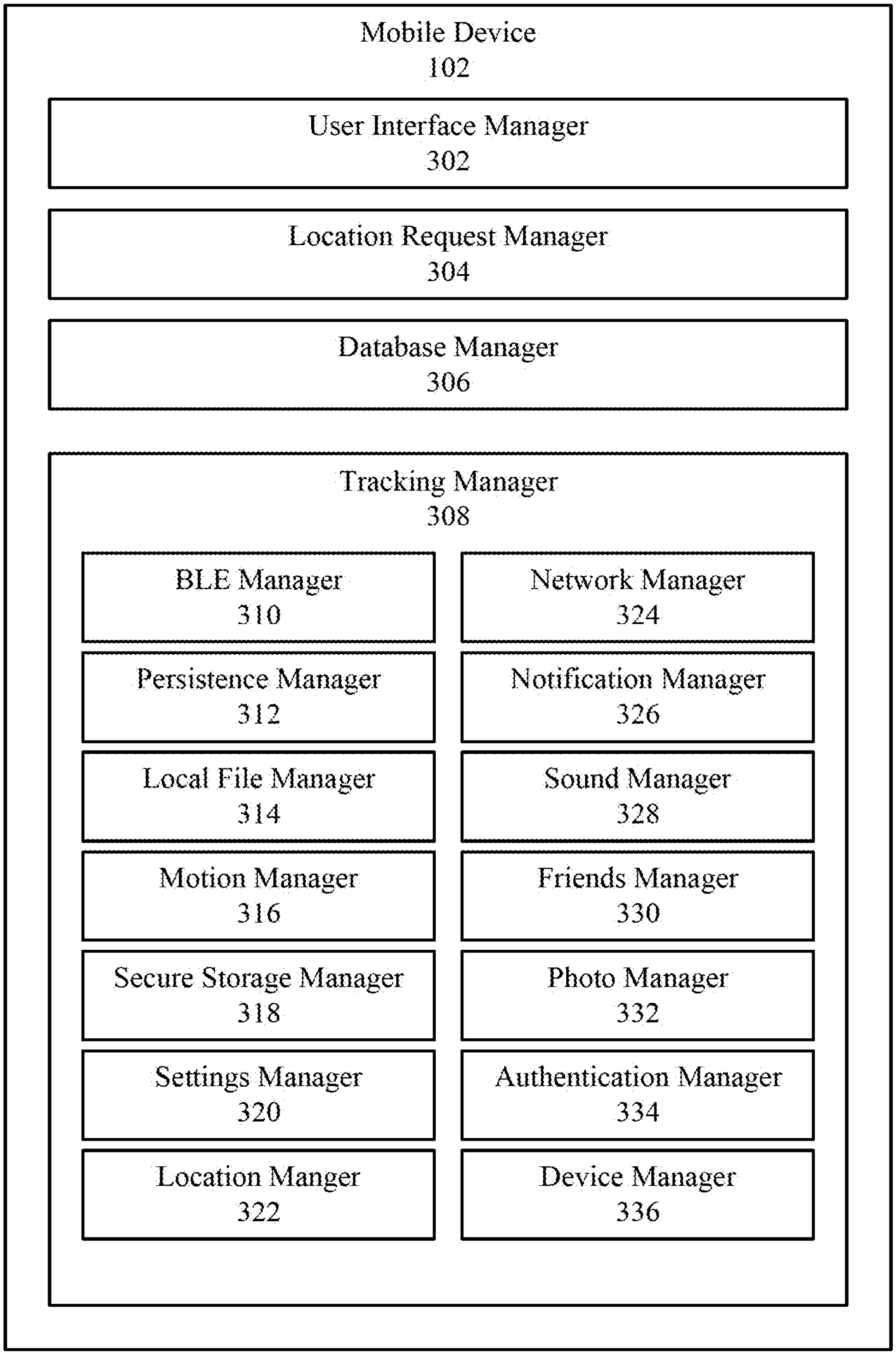
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100 and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may also comprise a tracking application (e.g., a software application) for communicating with and locating a tracking device 106 associated with the user 103. The tracking manager 308 may be configured to communicate with the unauthorized tracking device manager 218 of the tracking system 100 to provide the functionality discussed herein with respect to unauthorized device detection and handling. For example, the tracking manager 308 may be configured to receive notifications regarding unauthorized devices and facilitate user definition of authorized devices.

The tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. For instance, the friends manager 330 may allow a user to create or opt in to one or more sets of users (such as a "friends" circle, a "family" circle, a "co-workers" circle, etc.), allowing the user to establish such a set of users such that a collective action can be performed (such as sending a message or notification to each user in the set of users based on a status of a user or tracking device). The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
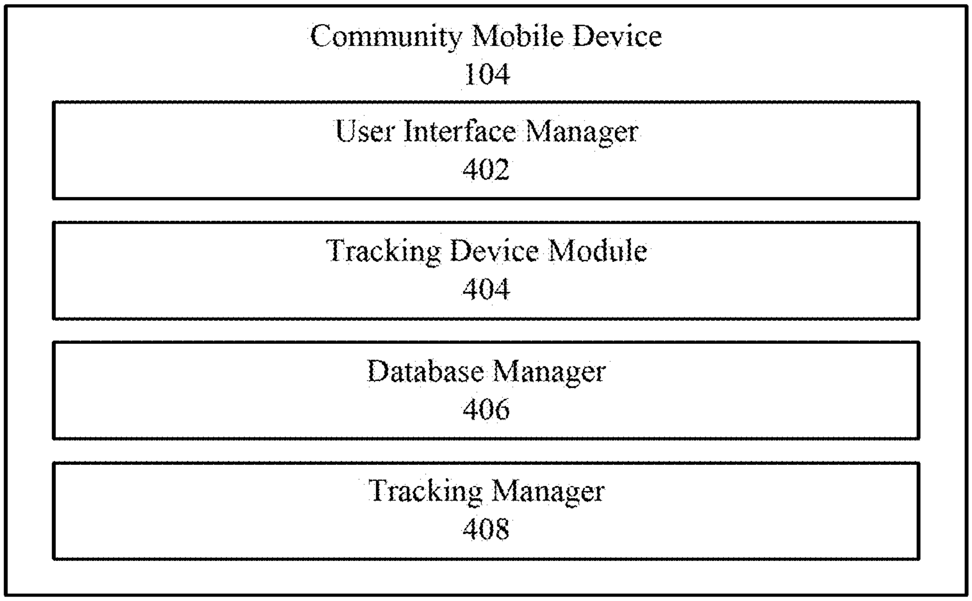
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment. It should also be noted that the community mobile device can be a device of a user within a same set of friends as the user 103 such that a set of messages can be sent to all users in the set of friends simultaneously in response to a status of one or more of the users or tracking devices within the set of friends.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength of a communication signal is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
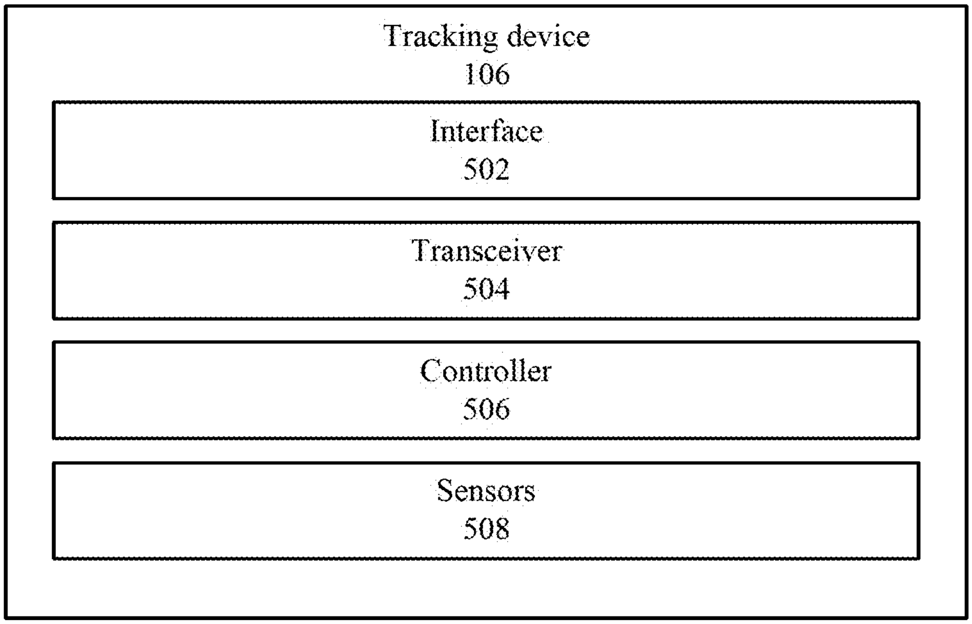
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5. In some embodiments, the tracking device 106 and the mobile device 102 are the same device (e.g., the mobile device includes the tracking device functionality described herein).

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

In some embodiments, the controller 506 may be configured to facilitate remote activation or deactivation of the tracking device 105, such as based on received instructions from the tracking system 100. The tracking system 100 may be configured to communicate activation or deactivation instructions to the tracking device 105 via the mobile device 102. For example, the instruction may be generated by the tracking system 100 when an unauthorized device is identified as an unauthorized tracking device managed by the tracking system 100, then sent to the mobile device 102 via the first network 108, and then to the tracking device 106 via the second network 110. In another example, the instruction may be provided to the tracking device 106 via a community mobile device 104. In another example, the instruction may be provided to the tracking device 106 without traveling through a mobile device 102/104, such as directly through the first network 108.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506.

Flight and Landing Detection and Notification

In some embodiments, a tracking system environment may be configured to detect when a user takes off on a flight at a first airport, and when the user lands at a second airport. When such events are detected, notifications can be sent to a connected set of users, informing the set of users that the user has departed from the first airport, landed at the second airport, or both.

A user's location can be received by the tracking system 100, which in turn can determine whether the user is at an airport. In some embodiments, the tracking system 100 maintains or can access an airport location database indicating locations of airports at various locations (such as within the United States or anywhere in the world). The airport location database can include geographic boundaries of airports, geographic coordinates corresponding to the airport's perimeter, geographic coordinates corresponding to a location associated with the airport (such as a geographic center of the airport), or any other representation of the location of the airport.

The tracking system 100 can determine that the user is at an airport by querying an airport location database with a received location of the user. As used herein, the received location can be transmitted by a tracking device of the user, such as a mobile phone of the user, or a standalone tracking device (such as the tracking device 106) of the user (in which case, the mobile device 102 can, in response to receiving a signal from the tracking device, provide the location of the mobile device as a proxy for the tracking device to the tracking server 100).

In some embodiments, the tracking system 100 determines that the user is at an airport in response to the received location of the user being located within a geographic boundary corresponding to an airport and maintained by the airport location database. In some embodiments, the tracking system 100 determines that the user is at an airport in response to the received location of the user being within a threshold distance of a location corresponding to the airport (such as a geographic center of the airport, or geographic coordinates associated with the airport, each maintained by the airport location database).

In some embodiments, the user's mobile device can determine that the user is at an airport, for instance by querying a stored set of locations associated with airports and comparing the stored set of locations with a location of the user. In such embodiments, the mobile device of the user may inform a tracking system 100 that the user is at an airport, in response to which the tracking system can monitor movement information of the user to determine if a takeoff event occurs.

After (or in response to) determining that the user is located at the airport, the tracking system 100 can determine if the user departed from the airport on an aircraft. In some embodiments, the tracking system 100 can access movement information (such as location, speed, and/or acceleration information) to determine that the user has departed on an aircraft. For instance, the tracking system 100 can determine that the user's location (received from a mobile device, tracking device, or a mobile device associated with a tracking device) moves along a location associated with a runway of the airport. As runways are typically only accessible to people while on a plane, the tracking system 100 can determine that the user has departed on an aircraft.

The tracking system 100 can also use speed and/or acceleration information from the tracking device to determine that the user has departed from the airport on an aircraft. For instance, if the acceleration of the user exceeds a threshold acceleration associated with aircraft takeoffs (for instance, for at least a threshold period of time) while the user is at the airport, then the tracking system 100 can determine that the user has departed on an aircraft. Likewise, if the user exceeds a speed threshold associated with aircraft departures (such as 125 mph, 150 mph, 175 mph, or any speed less than, between, or greater than these thresholds), then the tracking system 100 can determine that the user has departed on an aircraft. It should be noted that "location" as used herein can additionally refer to altitude, allowing the tracking system 100 to detect an aircraft takeoff event in response to a user's altitude increasing by more than a threshold amount within a threshold interval of time, or by increasing more than a threshold distance above a ground altitude at the location of the airport.

In some embodiments, the tracking system 100 can use two or more of a user's location, speed, and acceleration to determine that the user has departed on an aircraft. For instance, the tracking system 100 can determine that the user's speed (received from the tracking device) has exceeded a takeoff threshold while the user is located on or within a threshold distance of a runway of the airport, and can determine that the user has departed from the airport on an aircraft in response. In some embodiments, the tracking system 100 can determine that the user's acceleration has exceeded a takeoff threshold for at least a threshold amount of time while the user is located on or within a threshold distance of a runway, and can determine that the user has departed from the airport on an aircraft in response. In some embodiments, the tracking system 100 can determine that the user's speed exceeds a takeoff threshold after the user's acceleration has exceeded an acceleration threshold for a threshold amount of time, and can determine that the user has departed from the airport on an aircraft in response.

The tracking system 100 can determine that the user has landed at a second airport using movement and location information received from (or via) a tracking device. The tracking system 100 can receive a location of the user after the user is determined to have departed from the first airport, and the tracking system 100 can query an airport location database (as described above) to determine that the user is located at a second airport. In some embodiments, the tracking system can limit determine that a user has taken off from a first airport and landed at a second airport only if the location of the user at the first airport and the subsequent location of the user at the second airport are received within a threshold interval of time (such as 24 hours).

In some embodiments, the tracking system 100 can determine that the user has landed at a second airport in response to receiving a second location that is more than a threshold distance away from the location of the first airport, for instance within a threshold period of time during which it would not be possible or would be very unlikely that the user could travel between airports by means other than flight. In some embodiments, the tracking system 100 can determine that the user has landed at a second airport in response to determining that a deceleration of the user exceeds a threshold deceleration associated with aircraft landings while the user is located at the second airport. In some embodiments, the tracking system 100 can determine that the user has landed at a second airport in response determining that the user is located at a runway of the second airport. In yet other embodiments, the tracking system 100 can determine that the user has landed at the second airport in response to a speed of the user being above a first threshold and then later being below a second threshold within a threshold interval of time. In practice, the tracking system 100 can determine that the user has landed at a second airport in response to a combination of these factors.

The tracking system 100 can likewise determine that the user has taken off from a first airport in an aircraft and later landed at a second airport in response to receiving a location of the user at the first airport, receiving no location information for the user for a period of time, and then receiving a second location of the user at the second airport. In such embodiments, the tracking device (or an associated mobile device) of the user may not have communicative capability while the aircraft is airborne, and thus the tracking system 100 can determine that the user was on the aircraft while the aircraft flew from the first airport to the second airport. In some embodiments, the tracking device or associated mobile device of the user does have communicative capability while the aircraft is airborne (e.g., via on-flight wifi). In such embodiments, the tracking system 100 may receive location information for the user between the first airport and the second airport, and can use this location information to determine that the locations align with a flight path between the first airport and the second airport, enabling the tracking system 100 to determine that when the user arrives at the second airport, the user was on a flight that landed at the second airport (as opposed to simply driving between the airports).

The tracking system 100 can generate and send a notification or other communication to a set of users associated with a user in response to detecting that the user has taken off from a first airport in an aircraft, landed at a second airport, or both. The set of users can be a pre-selected or pre-determined set of users associated with the user. For instance, the user may create a set of users via an application running a mobile device (such as users that also use the application on their devices, users to which the user is connected via one or more social networks, users within the user's address boo, and the like). Likewise, the set of users may include a group of users to which the user was invited and/or joined. The set of users can include a group of one or more users.

The set of users may include a common category or theme, such as "friends", "family", "co-workers", and the like. In some embodiments, the set of users includes users that the user wants to notify about travel- or flight-related events. In some embodiments, the set of users is inferred as opposed to explicitly defined. For instance, the set of users can include users that the user commonly communicates with, users that have established a connection with within a tracking or notification application or other social network, users in the user's address book, and the like.

In some embodiments, the notifications are only sent by the travel system 100 if the user has opted in to such notifications being sent. For instance, the user can pre-select one or more sets of users to receive flight takeoff and landing notifications, can select and customize subject matter included within such notifications, and can opt-in to the notifications being sent without explicitly requesting approval by the user. In some embodiments, the user can opt-in to general notifications related to a location or activity of the user being sent to one or more sets of users, and the travel system 100 can send flight takeoff and landing notifications in response.

The takeoff and landing notifications sent by the travel system 100 can be sent to an application running on the devices of a set of users, such as a tracking or social network application (for instance, the application used by the user to opt-in to such notifications being sent). In some embodiments, the notifications are sent via text or SMS messages, or are sent as system notifications that are displayed in a notification feed within the devices of the set of users to which the notifications are sent. In other embodiments, the notifications can be sent to the set of users within one or more platforms, such as a social network, a message board, a communication application thread, and the like.

It should be noted that the travel system 100 can send the notifications without explicit input from the user. For instance, a user can opt-in to such notifications being sent, and then the travel system 100, in response to determining that the user has departed from a first airport or landed at a second airport, can identify a set of users associated with the user (such as a pre-selected set of users or a set of users with which the user most commonly interacts), and can send a take-off or landing notification without the user having to explicitly request that it be sent. It should be noted that the travel system 100 can identify take-off and landing events without explicitly being told by the user that the user is traveling. According, the travel system 100 may beneficially inform a set of users about a user's departure and/or safe arrival without requiring the user to perform any actions (other than opting-in to such notifications in advance and/or joining a set of users to which the notifications are sent in advance).

The travel system 100 can include any suitable information within the notifications that are sent to the set of users. For instance, a notification can identify the user, and may identify the set of users (such as by a name of the set of users). In some embodiments, the notification can identify the airport from which the user departed (e.g., by city name or airport code). Likewise, in some embodiments, the notification can identify the airport at which the user lands (by city name or airport code). In some embodiments, the notifications identify a time of departure and/or a time of arrival. The travel system 100 can send separate takeoff/departure and landing/arrival notifications, which in other embodiments, a takeoff notification can be sent when the user departs from an airport, and the takeoff notification can later be modified to include information corresponding to the user landing at an arrival airport.

Figure 6:
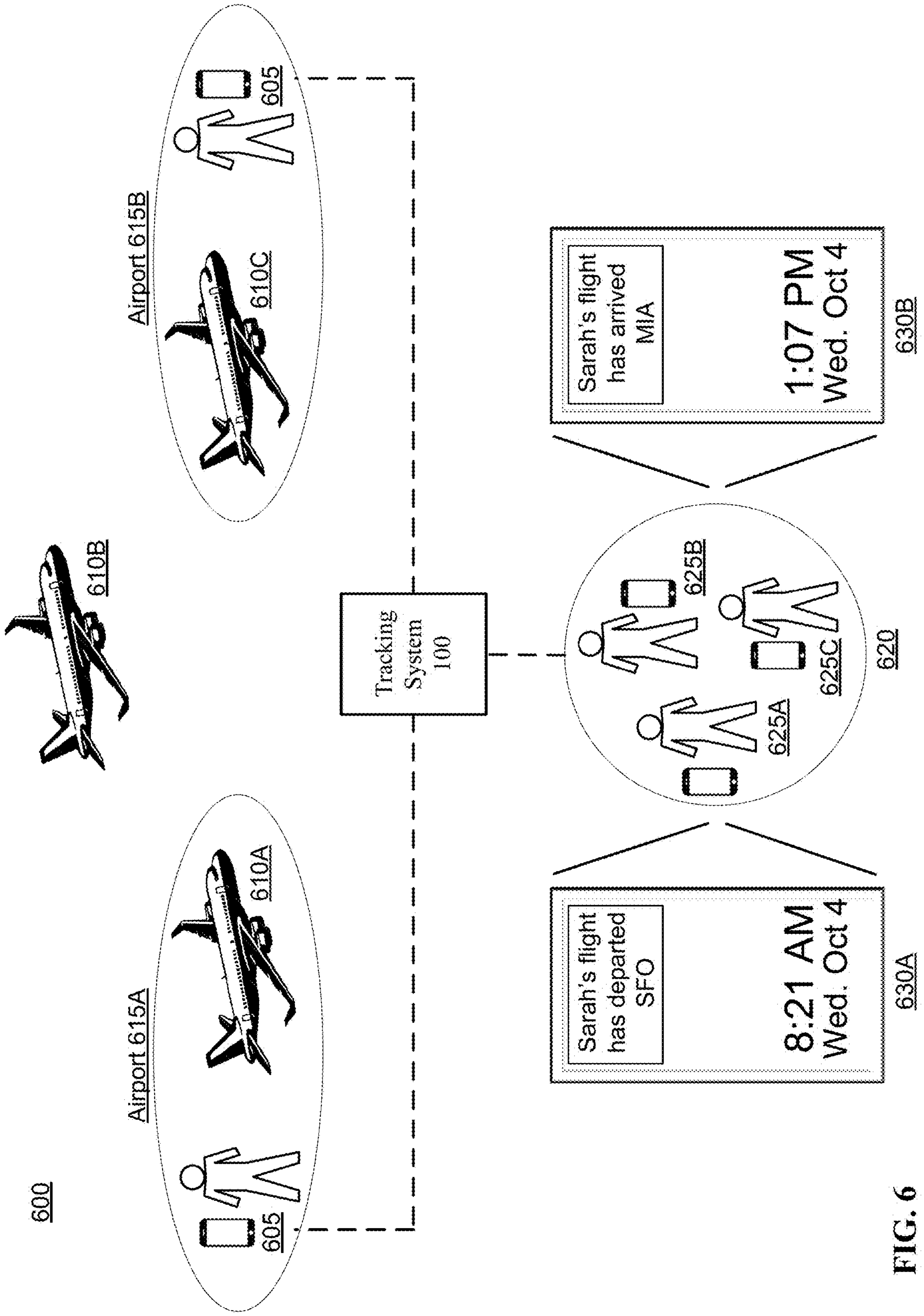
FIG. 6 illustrates an example environment in which a user's flight takeoff and landing is detected and notifications are sent to an associated set of users, according to one embodiment.

FIG. 6 illustrates an example environment in which a user's flight takeoff and landing is detected and notifications are sent to an associated set of users, according to one embodiment. In the embodiment of FIG. 6, a user 605 with a mobile device with tracking functionality arrives at a first airport 615A. It should be noted that the mobile device may be a mobile phone, a tracking device (such as a tracking device coupled to an object of the user's), a wearable device (such as a smart watch with tracking functionality), or any other suitable device.

The mobile device of the user 605 periodically provides location information corresponding to the user to the tracking system 100. In response, the tracking system 100 queries an airport location database to determine if the location provided by the mobile device is located at an airport. The tracking system 100 determines that the received location is within a threshold distance of a location associated with a first airport 615A, and classifies the user 605 as a candidate aircraft passenger. In response, the tracking system 100 can request and receive movement information (such as location information, speed information, and acceleration information) associated with the user 605 (or can simply receive movement information from the mobile device as part of the mobile device's ordinary tracking functionality). The tracking system 100 can (as described above) monitor one or more patterns within the movement information (such as comparing speed and acceleration information to speed and acceleration thresholds associated with an aircraft taking off) to determine if the user 605 departs from the first airport 615A on an aircraft (such as the aircraft 610A).

In response to determining that the user 605 has departed from the first airport 615A on the aircraft 610A, the tracking system 100 can identify a set of users associated with the user 605 (such as the set 620 which includes users 625A, 625B, and 625C, each with a mobile device). As noted above, the set 620 of users can be pre-selected or predetermined, for instance in response to the user 605 joining the set 620 of users within an application running on the mobile devices of the user and set of users. The tracking system 100, in response to determining that the user 605 has taken off from the first airport 615A, sends a notification 630A to the devices of the set of users 620 indicating that the user 605 has departed on a flight. In the embodiment of FIG. 6, the notification 630A includes the text "Sarah's flight has departed SFO".

In the embodiment of FIG. 6, the user 605 does not have connectivity between the mobile device of the user and the tracking system 100, for instance because the user does not have access to in-flight wifi. The plane 610C then subsequently lands at the second airport 615B. It should be noted that the planes 610A, 610B, and 610C illustrated in FIG. 6 are the same plane, and that the different reference letter "A", "B", and "C" simply indicates a different time during the plane's flight.

After the plane 610C lands at the second airport 615B, the mobile device of the user 605 provides a second location to the tracking system 100. The tracking system 100, in response to receiving the second location, queries the airport location database to determine if the received second location corresponds to an airport. In the embodiment of FIG. 6, the tracking system 100 determines that the received second location does indeed correspond to the second airport 615B. The tracking system 100 can flag the arrival of the user 605 at the second airport 615B as an aircraft landing, for instance based on the received second location alone, or based additionally on one or more other components of information, such as a time elapsed between receiving the first location and the second location, movement information (such as deceleration data) of the user 605, and based on any other suitable information, as described herein.

In response to determining that the user 605 has landed at the second airport 615B, the tracking system 100 can identify a set of users (again, such as the set 620), and can generate a notification 630B indicating that the user 605 has landed at the second airport 615B. In the embodiment of FIG. 6, the notification 630B includes the text "Sarah's flight has arrive MIA", indicating that Sarah has landed at the Miami airport.

Figure 7:
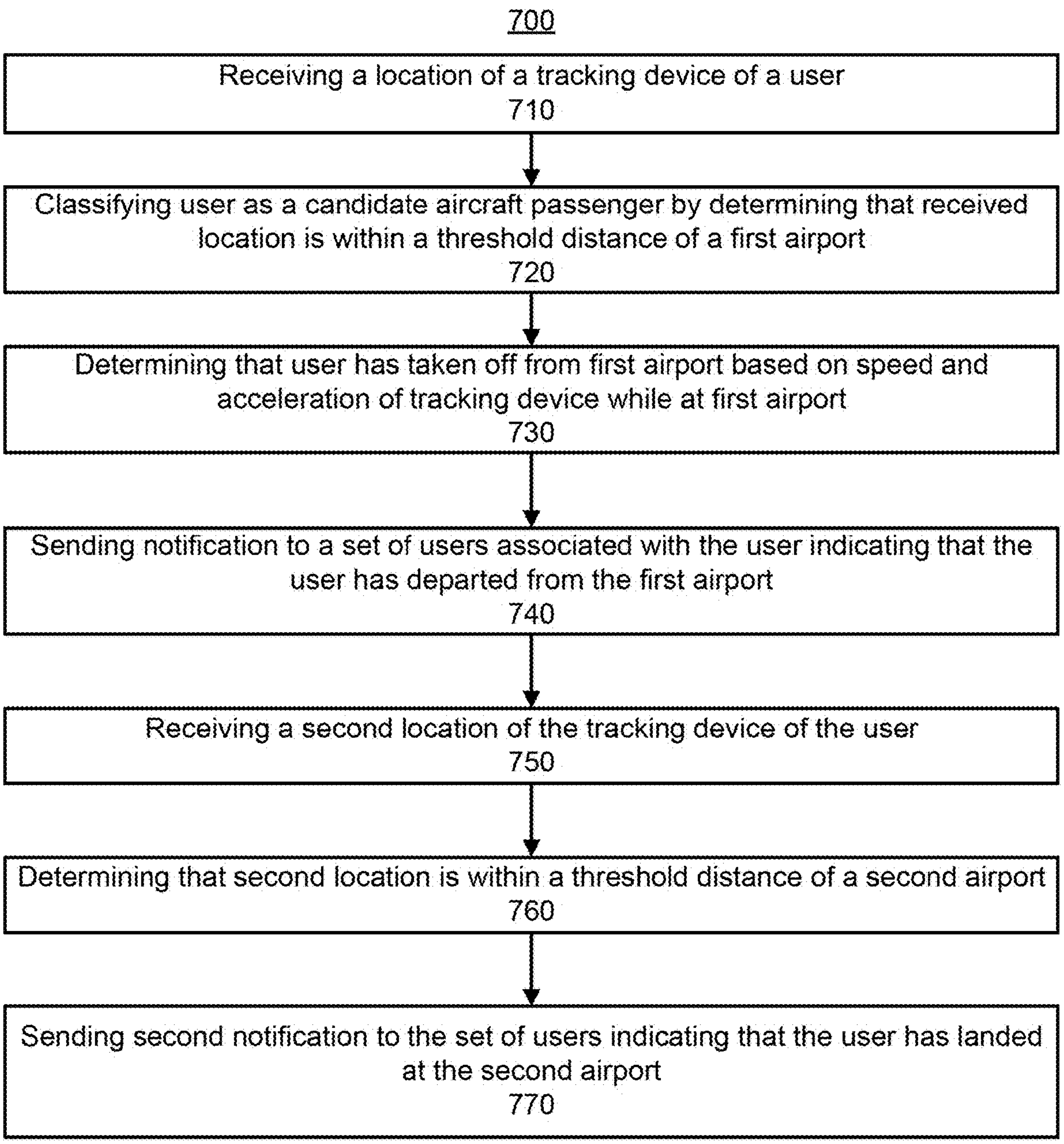
FIG. 7 is a flowchart illustrating a process for automatically detecting a flight takeoff and landing, and sending notifications to an associated set of users, according to one embodiment.

FIG. 7 is a flowchart illustrating a process for automatically detecting a flight takeoff and landing, and sending notifications to an associated set of users, according to one embodiment. Other embodiments of this process can include fewer, additional, or different steps than those illustrated herein.

A location of a tracking device of a user is received 710, for instance by a tracking server. A user is classified 720 as a candidate aircraft passenger in response to determining that the received location is within a threshold distance of a first airport. The user can be determined to be within a threshold distance of an airport by querying an airport location database within the received location, for instance by determining if the received location within a geographic boundary associated with an airport.

It is determined 730 (for instance, by the tracking server) if the user has taken off from the first airport in an aircraft based on movement information corresponding to the user, such as location, speed, and acceleration information. A notification is sent 740 to a set of users associated with the user, such as a pre-established group of friends connected via an application that runs on a mobile device of the user and devices of the set of users. The notification can identify the user, can identify that the user departed from an airport, can identify the airport, can include a time of departure, and can include any additional information relevant to the user departing the first airport.

A second location of the user is received 750, for instance from the tracking device. The second location is determined 760 to be within a threshold distance of a second airport, for instance by querying an airport location database. The user can be determined to have landed at the second airport in an aircraft, for instance based on the received second location, and/or based on movement information associated with the user (such as speed and deceleration information). In response to determining that the second user has landed at the airport, a second notification is sent 770 to the set of users. The second notification can indicate that the user has landed safely, and can identify any other information associated with the landing event, such as the airport at which the user landed and the time that the user landed.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving, by a tracking server, a location of a tracking device of a user;

classifying, by the tracking server, the user as a candidate aircraft passenger by querying an airport location database with the received location of the tracking device and determining that the received location is within a threshold distance of a first airport;

in response to classifying the user as a candidate aircraft passenger, determining, by the tracking server, that the user has taken off at the first airport in an aircraft based on a comparison of speed and acceleration information representative of a movement of the tracking device to speed and acceleration thresholds corresponding to an aircraft takeoff;

in response to determining that the user has taken off, transmitting, by the tracking server, a notification to a set of one or more devices associated with a set of one or more users connected to the user, the notification indicating that the user has departed from the first airport;

receiving, by the tracking server, a second location of the tracking device of the user;

determining, by the tracking server, that the second location is within a threshold distance of a second airport by querying the airport location database with the second received location;

determining, by the tracking server, that the user has landed based on a comparison of a second speed of the tracking device to a second speed threshold corresponding to an aircraft landing; and in response to determining that the user has landed, transmitting, by the tracking server, a second notification to the set of devices associated with the set of users connected to the user indicating that the user has landed at the second airport.

2. The method of claim 1, wherein the tracking device comprises one or more of: a mobile phone, a tracking device coupled to a belonging of the user, or a wearable tracking device worn by the user.

3. The method of claim 1, wherein determining that the user has taken off at the first airport comprises determining that the acceleration of the tracking device exceeds the acceleration threshold for a threshold amount of time, and that the speed of the tracking device exceeds a minimum speed threshold at an end of the threshold amount of time.

4. The method of claim 1, wherein determining that the user has landed further comprises receiving the second location of the tracking device within a threshold amount of time of determining that the user has taken off in the aircraft.

5. The method of claim 1, wherein determining that the user has landed further comprises determining that a third speed of the tracking device at the second airport is greater than a third speed threshold and then later determining that the second speed of the tracking device is less than the second speed threshold.

6. The method of claim 1, wherein the notification and the second notification are sent only if the user has opted in to airport departure and airport landing notifications.

7. The method of claim 1, wherein the notification and the second notification are sent without an input from the user requesting that the notification and the second notification be sent.

8. A non-transitory computer-readable storage medium storing executable instructions that, when executed by a hardware processor of a tracking server, cause the tracking server to perform steps comprising:

receiving, by the tracking server, a location of a tracking device of a user;

classifying, by the tracking server, the user as a candidate aircraft passenger by querying an airport location database with the received location of the tracking device and determining that the received location is within a threshold distance of a first airport;

in response to classifying the user as a candidate aircraft passenger, determining, by the tracking server, that the user has taken off at the first airport in an aircraft based on a comparison of speed and acceleration information representative of a movement of the tracking device to speed and acceleration thresholds corresponding to an aircraft takeoff;

in response to determining that the user has taken off, transmitting, by the tracking server, a notification to a set of one or more devices associated with a set of one or more users connected to the user, the notification indicating that the user has departed from the first airport;

receiving, by the tracking server, a second location of the tracking device of the user;

determining, by the tracking server, that the second location is within a threshold distance of a second airport by querying the airport location database with the second received location;

determining, by the tracking server, that the user has landed based on a comparison of a second speed of the tracking device to a second speed threshold corresponding to an aircraft landing; and in response to determining that the user has landed, transmitting, by the tracking server, a second notification to the set of devices associated with the set of users connected to the user indicating that the user has landed at the second airport.

9. The non-transitory computer-readable storage medium of claim 8, wherein the tracking device comprises one or more of: a mobile phone, a tracking device coupled to a belonging of the user, or a wearable tracking device worn by the user.

10. The non-transitory computer-readable storage medium of claim 8, wherein determining that the user has taken off at the first airport comprises determining that the acceleration of the tracking device exceeds the acceleration threshold for a threshold amount of time, and that the speed of the tracking device exceeds a minimum speed threshold at an end of the threshold amount of time.

11. The non-transitory computer-readable storage medium of claim 8, wherein determining that the user has landed further comprises receiving the second location of the tracking device within a threshold amount of time of determining that the user has taken off in the aircraft.

12. The non-transitory computer-readable storage medium of claim 8, wherein determining that the user has landed further comprises determining that a third speed of the tracking device at the second airport is greater than a third speed threshold and then later determining that the second speed of the tracking device is less than the second speed threshold.

13. The non-transitory computer-readable storage medium of claim 8, wherein the notification and the second notification are sent only if the user has opted in to airport departure and airport landing notifications.

14. The non-transitory computer-readable storage medium of claim 8, wherein the notification and the second notification are sent without an input from the user requesting that the notification and the second notification be sent.

15. A method comprising:

receiving, by a tracking server, a first location of a tracking device of a user;

classifying, by the tracking server, the user as a candidate passenger on an aircraft by querying an airport location database with the first location of the tracking device and determining that the first location is within a threshold distance of a first airport;

receiving, by the tracking server, a second location of the tracking device of the user;

determining, by the tracking server, that the second location is within a threshold distance of a second airport by querying the airport location database with the second received location; and in response to 1) the first location being within a threshold distance of the first airport, 2) the second location being within a threshold distance of the second airport, and 3) the first location and the second location being received within a threshold amount of time, transmitting, by the tracking server, a notification to a set of one or more devices associated with the set of one or more users connected to the user indicating that the user has landed at the second airport.

16. The method of claim 15, wherein the tracking comprises one or more of: a mobile phone, a tracking device coupled to a belonging of the user, or a wearable tracking device worn by the user.

17. The method of claim 15, wherein the tracking server does not receive location information associated with the tracking device between receiving the first location information and the second location information.

18. The method of claim 15, wherein the notification is sent only if the user has opted in to airport landing notifications.

19. The method of claim 15, wherein the notification is sent without an input from the user requesting that the notification be sent.

20. The method of claim 15, wherein the set of users is defined before the aircraft takes off from the first airport.

* * * * *